(12) United States Patent
Takemura et al.

(10) Patent No.: US 9,064,418 B2
(45) Date of Patent: Jun. 23, 2015

(54) VEHICLE-MOUNTED ENVIRONMENT RECOGNITION APPARATUS AND VEHICLE-MOUNTED ENVIRONMENT RECOGNITION SYSTEM

(75) Inventors: Masayuki Takemura, Hitachi (JP); Shoji Muramatsu, Hitachinaka (JP); Isao Furusawa, Hitachinaka (JP); Shinya Ohtsuji, Naka-gun (JP); Takeshi Shima, Mito (JP); Yuji Otsuka, Hitachinaka (JP); Tatsuhiko Monji, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 353 days.

(21) Appl. No.: 13/575,173

(22) PCT Filed: Aug. 13, 2010

(86) PCT No.: PCT/JP2010/063752
§ 371 (c)(1),
(2), (4) Date: Jul. 25, 2012

(87) PCT Pub. No.: WO2011/114547
PCT Pub. Date: Sep. 22, 2011

(65) Prior Publication Data
US 2012/0327188 A1    Dec. 27, 2012

(30) Foreign Application Priority Data
Mar. 17, 2010    (JP) .................................. 2010-060104

(51) Int. Cl.
*G08G 1/16*    (2006.01)
*G06K 9/00*    (2006.01)
*G01S 11/12*    (2006.01)

(52) U.S. Cl.
CPC . *G08G 1/16* (2013.01); *G01S 11/12* (2013.01); *G06K 9/00798* (2013.01); *G06K 9/00825* (2013.01)

(58) Field of Classification Search
USPC ........... 348/61, 149, 112, 120, 148, 169, 116, 348/118, 119, 113; 382/103, 104, 106, 107
See application file for complete search history.

(56) References Cited

U.S. PATENT DOCUMENTS 6,285,393 B1 * 9/2001 Shimoura et al. ............. 348/119
7,925,050 B2 * 4/2011 Nagaoka et al. .............. 382/104
(Continued)

FOREIGN PATENT DOCUMENTS

JP    11-317939 A    11/1999
JP    2002-98509 A    4/2002
(Continued)

OTHER PUBLICATIONS

International Search Report dated Nov. 22, 2010 including English-language translation (Two (2) pages).

*Primary Examiner* — Paulos M Natnael
(74) *Attorney, Agent, or Firm* — Crowell & Moring LLP

(57) ABSTRACT

A vehicle-mounted environment recognition apparatus including a simple pattern matching unit which extracts an object candidate from an image acquired from a vehicle-mounted image capturing apparatus by using a pattern shape stored in advance and outputs a position of the object candidate, an area change amount prediction unit which calculates a change amount prediction of the extracted object candidate on the basis of an object change amount prediction calculation method set differently for each area of a plurality of areas obtained by dividing the acquired image, detected vehicle behavior information, and an inputted position of the object candidate, and outputs a predicted position of an object, and a tracking unit which tracks the object on the basis of an inputted predicted position of the object.

8 Claims, 11 Drawing Sheets

(56) References Cited

U.S. PATENT DOCUMENTS

| | | | |
|---|---|---|---|
| 8,005,266 B2* | 8/2011 | Saka et al. | 382/104 |
| 8,594,378 B2* | 11/2013 | Mori et al. | 382/103 |
| 2008/0260207 A1* | 10/2008 | Nagaoka et al. | 382/103 |
| 2009/0041302 A1* | 2/2009 | Nagaoka et al. | 382/103 |
| 2012/0219183 A1* | 8/2012 | Mori et al. | 382/103 |

FOREIGN PATENT DOCUMENTS

| | | |
|---|---|---|
| JP | 2005-170290 A | 6/2005 |
| JP | 2008-113296 A | 5/2008 |

* cited by examiner

FIG.10

PRESUME THREE-DIMENTIONAL POSITION FROM IMAGE COORDINATES AT t SECOND $$S \begin{bmatrix} u_t \\ v_t \\ 1 \end{bmatrix} = \begin{bmatrix} \text{CAMERA} \\ \text{INTERNAL} \\ \text{PARAMETER} \end{bmatrix} \begin{bmatrix} \text{CAMERA} \\ \text{EXTERNAL} \\ \text{PARAMETER} \end{bmatrix} \begin{bmatrix} X_t \\ Y_t \\ Z_t \\ 1 \end{bmatrix} \quad \cdots \text{(FORMULA 1)}$$

OBJECT POSITION AT t SECOND IN VEHICLE COORDINATE SYSTEM

A MOUNT OF MOVEMENT IN ONE PERIOD
   = VEHICLE SPEED [m/s] × PROCESS PERIOD [s]
     Vm = CarSpeed × Cycle RE-PRESUME IMAGE COORDINATES AFTER ONE PERIOD BY REFLECTING DEPTH CHANGE BY VEHICLE SPEED ON PRESUMED THREE-DIMENTIONAL POSITION $$S \begin{bmatrix} u_{t+1} \\ v_{t+1} \\ 1 \end{bmatrix} = \begin{bmatrix} \text{CAMERA} \\ \text{INTERNAL} \\ \text{PARAMETER} \end{bmatrix} \begin{bmatrix} \text{CAMERA} \\ \text{EXTERNAL} \\ \text{PARAMETER} \end{bmatrix} \begin{bmatrix} X_t \\ Y_t \\ Z_t - V_m \\ 1 \end{bmatrix} \quad \cdots \text{(FORMULA 2)}$$

VEHICLE-MOUNTED ENVIRONMENT RECOGNITION APPARATUS AND VEHICLE-MOUNTED ENVIRONMENT RECOGNITION SYSTEM

TECHNICAL FIELD

The present invention relates to a vehicle environment recognition apparatus using a vehicle-mounted camera and a system that uses the vehicle environment recognition apparatus.

BACKGROUND ART

In recent years, a camera for recognizing an environment around a vehicle such as a passenger car is being developed. In such techniques, by utilizing the features of camera that can sense a two-dimensional image, a recognition method using shape information of an object and a recognition method using motion difference between an object and a background are developed.

A method of Patent Document 1 (Japanese Unexamined Patent Application Publication No. Hei11-317939) realizes accurate tracking by recognizing an object, for example, another vehicle, from an image captured by a camera mounted in one vehicle and predicting motion of a specific point on the other vehicle based on behavior of the one vehicle. This method predicts the specific point moving on the image by recognizing the object and defining the height of the specific point present in the object.

CITATION LIST

Patent Literature

Patent Literature 1: Japanese Unexamined Patent Application Publication No. Hei11-317939

SUMMARY OF INVENTION

Technical Problem

Considering nighttime vehicle detection for performing light distribution control, it is necessary to detect a vehicle only from information of point light sources such as headlights or taillights. To stably perform light control, it is necessary to stably detect vehicle. To stably detect vehicle, it is necessary to stably perform determination of cause of misdetection and determination of vehicle detection, so that tracking of light source including noise is an important object.

In Patent Literature 1, various pieces of information such as vehicle shape information can be used because of assuming daytime, so that it is possible to perform appropriate tracking by defining the height of the specific point after recognizing the object to be detected. However, it is difficult to determine whether or not the object is a vehicle only from point light sources in the nighttime. There are various causes of misdetection, such as a two-wheeled vehicle, a reflective plate placed on a road, a light source of vending machine, and a streetlight, so that it is difficult to determine those only from shape information of point light source.

Therefore, in this conventional configuration, the height of the specific point cannot be defined unless the object to be tracked is determined, so that it is difficult to perform appropriate tracking using the behavior of the one vehicle. In a tracking method on a normal image, in the case of a light source near the one vehicle or when the one vehicle turns, an amount of movement on the image is large, so that it is difficult to perform tracking.

An object of the present invention is to provide a vehicle-mounted environment recognition apparatus and a vehicle-mounted environment recognition system which can realize accurate and stable tracking even when the vehicle turns or the object to be tracked is near the vehicle and the amount of movement of the object on the image is large.

Solution to Problem

To solve the above problem, the vehicle-mounted environment recognition apparatus and the vehicle-mounted environment recognition system of the present invention include a pattern matching unit which extracts an object candidate from an image acquired from a vehicle-mounted image capturing apparatus by using a pattern shape stored in advance and outputs a position of the object candidate, an area change amount prediction unit which calculates a change amount prediction of the extracted object candidate on the basis of an object change amount prediction calculation method set differently for each area of a plurality of areas obtained by dividing the acquired image, detected vehicle behavior information, and an inputted position of the object candidate, and outputs a predicted position of an object, and a tracking unit which tracks the object on the basis of an inputted predicted position of the object.

Advantageous Effects of Invention

It is possible to provide a vehicle-mounted environment recognition apparatus and a vehicle-mounted environment recognition system which realize accurate and stable tracking even when the vehicle turns or the object to be tracked is near the vehicle and the amount of movement of the object on the image is large.

The other objects, features, and advantages of the present invention will be obvious from the embodiment of the present invention described below with reference to the attached drawings.

BRIEF DESCRIPTION OF DRAWINGS

FIG. 10 is a diagram for explaining a straight-ahead movement amount prediction using vehicle speed of the present invention.

DESCRIPTION OF EMBODIMENT

An embodiment of the present invention will be described with reference to the drawings.

Embodiment

In this description, an example of a vehicle-mounted environment recognition apparatus which performs nighttime vehicle detection by a vehicle mounted camera used for vehicle headlight control will be described. In particular, noise factor elimination effect only in the case of detecting a tail light of a leading vehicle will be described in the present embodiment. However, it is not limited to tail light, and the same effect can be obtained by detecting a headlight of an oncoming vehicle. Further, it is not limited to light, and the present embodiment can also be applied to recognition of an object such as a streetlight, a road sign, and a traffic signal.

Figure 1:
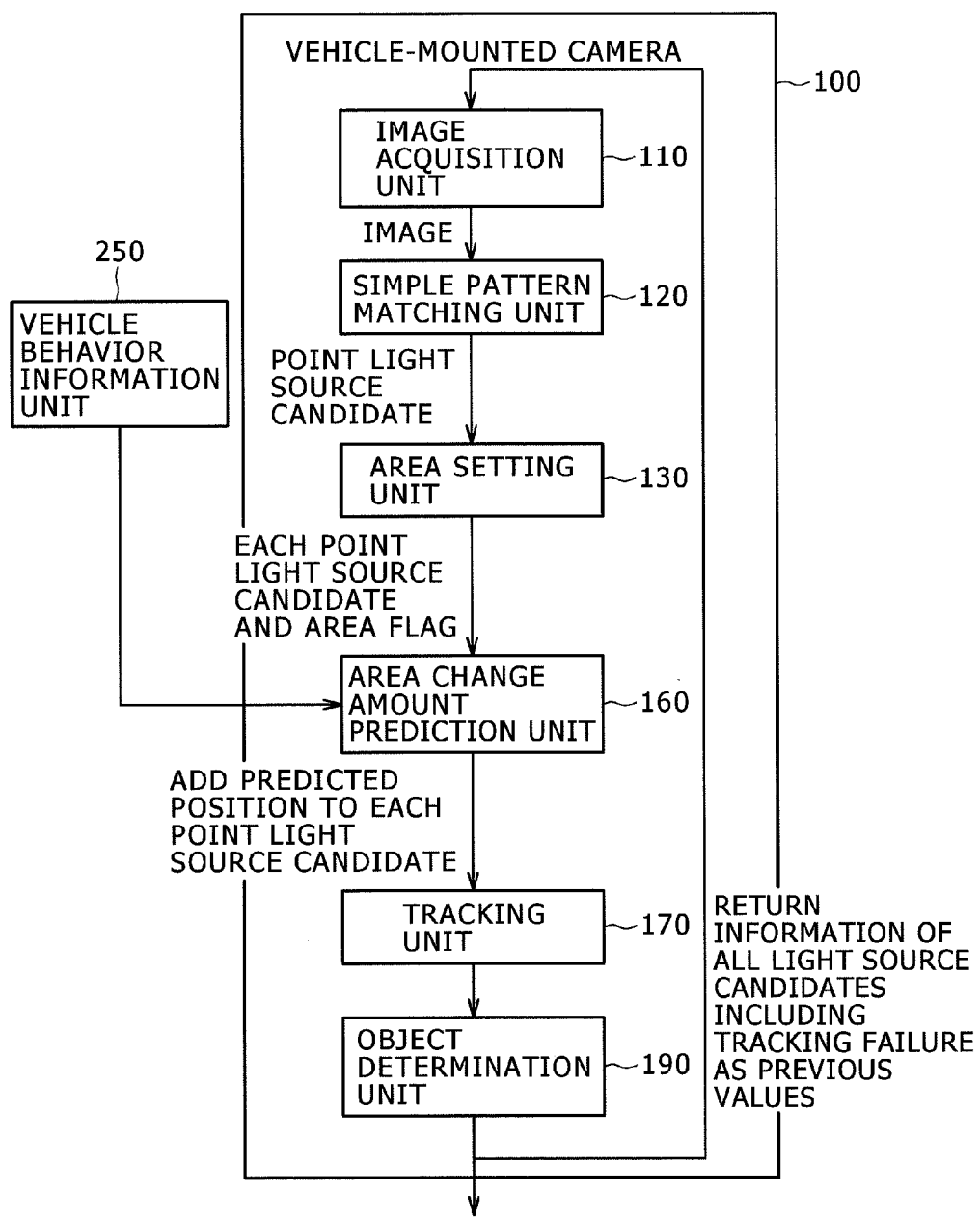
FIG. 1 is a diagram showing a configuration example of a vehicle-mounted environment recognition apparatus according to the present invention.

FIG. 1 shows a configuration of the vehicle-mounted environment recognition apparatus of the present embodiment. The vehicle-mounted environment recognition apparatus includes a vehicle-mounted camera 100, which is a vehicle-mounted image capturing apparatus, and a vehicle behavior information unit 250. The vehicle-mounted camera 100 includes an image acquisition unit 110, a simple pattern matching unit 120, an area setting unit 130, an area change amount prediction unit 160, a tracking unit 170, and an object determination unit 190.

First, the image acquisition unit 110 acquires a captured image.

Next, the simple pattern matching unit 120 compares a brightness value of a pixel of interest with brightness values of pixels around the pixel of interest to detect a point light source on the captured image and determines that the pixel of interest is a point light source candidate when the brightness value of the pixel of interest is higher than the brightness values of the pixels around the pixel of interest by a threshold value or more. Specifically, the simple pattern matching unit 120 is a pattern matting unit which extracts an object candidate from an image acquired from the vehicle-mounted camera 100, which is vehicle-mounted image capturing apparatus, by using a pattern shape stored in advance and outputs a position of the object candidate.

As another method, when internal parameters such as a focal length, a depression angle of the camera, a position, and the like of the camera installed as the vehicle-mounted camera 100 are known, it is possible to narrow down objects to be recognized to some extent. For example, a small red high brightness area present in a marginal portion of an image of an area near the vehicle is highly likely noise. In this way, threshold values of the size, the brightness, and the red color phase of a brightness area are determined and simple pattern matching may be performed so that non-detection of vehicle tail light does not occur.

Next, the area setting unit 130 sets an area for each calculation method of the area change amount prediction unit 160.

In the present embodiment, an area is divided into a low layer for an object near a road surface, a middle layer left and a middle layer right for a vehicle, a vending machine, and the like, which are obtained by dividing the area at near the vanishing point, and a high layer for a streetlight, a traffic signal, and a road sign. Basically, if a plurality of areas can be set by dividing an image area into an area (a first area) including the vanishing point and the other area (a second area) different from the first area, the image area may be divided in any way. In other words, the plurality of areas set by the area setting unit 130 are a middle layer left area and a middle layer right area obtained by dividing the first area into two areas at the vanishing point, a low layer area which is set on one side of the first area in the vertical direction in the second area, and a high layer area which is set on the other side of the first area in the vertical direction in the second area. An area flag of an area to which a point light source candidate belongs is added to each point light source candidate obtained as a result of the simple pattern matching unit 120.

The area change amount prediction unit 160 performs a prediction calculation of a change amount (an amount of movement of a light point) for each area flag to which each point light source belongs. Specifically, the area change amount prediction unit 160 calculates a change amount prediction of an extracted object candidate on the basis of an object change amount prediction calculation method set differently for each area of a plurality of areas obtained by dividing an image acquired by the vehicle-mounted camera 100, detected vehicle behavior information, and an inputted position of the object candidate, and outputs a predicted position of the object. A presumption calculation of a three-dimensional position is performed using the height and the depression angle of the camera from the image position extracted by the simple pattern matching unit 120, the predicted position is added to each point light source candidate, and the point light source candidates are outputted. In this case, to estimate the three-dimensional position from the camera, it is necessary to add three-dimensional constraint condition.

In the present embodiment, the condition is added for each area set by the area setting unit 130. Thereby, a first calculation method is performed in the low layer, a second calculation method is performed in the middle layer left, a third calculation method is performed in the middle layer right, and a fourth calculation method is performed in the high layer, and accurate tracking is performed even before the object to be recognized is determined on the entire image.

The tracking unit 170 performs tracking, that is, chasing, by using the point light source candidate of current period obtained by the simple pattern matching unit 120 and the change amount in the current period which is predicted from the point light source candidate of the previous period by the area change amount prediction unit 160. In other words, the tracking unit 170 tracks the object on the basis of an inputted predicted position of the object. The tracking unit 170 can analyze the height of an object that behaves in the same manner as the vehicle.

In the object determination unit 190, if tracking is established between a result of the change amount prediction calculation when temporarily calculating the height from the road surface of an object classified to belong to the low layer and a similar position in each frame, the object determination unit 190 recognize that the point light source candidate is highly likely to be an on-street motionless object. This indicates that the point light source candidate is highly likely to be a cause of misdetection, such as a triangle plate which is placed on a road and reflects red light or a cat's-eye on a sidewalk. Therefore, the object determination unit adds a flag to the point light source candidate as a motionless object.

The object determination unit 190 determines whether or not an object that is not determined to be an on-street motionless object is a headlight of another vehicle. First, the object determination unit 190 searches for a pair of candidates having a degree of similarity of the on-street motion objects which is smaller than or equal to a predetermined threshold value thr1. Since the lights of a vehicle are horizontally aligned, the object determination unit 190 checks whether or not the candidates that are successfully tracked and have a similarity are aligned so that the difference of the heights of the candidates is small on the image. The object determination unit 190 also checks whether or not an area difference between labeling results of the left and right lights is small and checks the color phases of the lights, so that the object determination unit 190 determines whether the candidates are a pair of the left and right lights of the same vehicle. When the objects are determined to be lights of the same vehicle, the vehicle is determined to be a four-wheeled vehicle. On the other hand, a candidate that does not make a pair is determined to be an on-street motionless object if the degree of similarity is higher than a predetermined threshold value thr2 and is determined to be a tail light of a two-wheeled vehicle if the degree of similarity is lower than a predetermined threshold value thr2. In summary, the object determination unit 190 determines whether or not the object is an on-street motionless object on the basis of the result of the tracking performed by the tracking unit 170, and if the object determination unit 190 determines that the object is not an on-street motionless object, the object determination unit 190 determines whether or not the object is a tail light of a vehicle on the basis of the result of the tracking.

Figure 2:
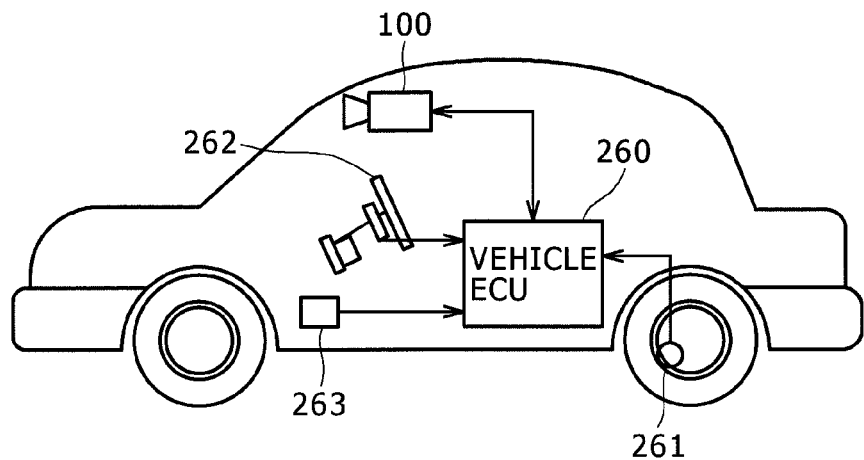
FIG. 2 is a diagram showing a configuration of a vehicle in which the vehicle-mounted environment recognition apparatus of the present invention is mounted.

FIG. 2 shows an arrangement diagram of the vehicle-mounted environment recognition apparatus that is mounted in a vehicle. FIG. 2 shows a configuration in which the vehicle-mounted camera 100 main body includes an image processing function.

Figure 3:
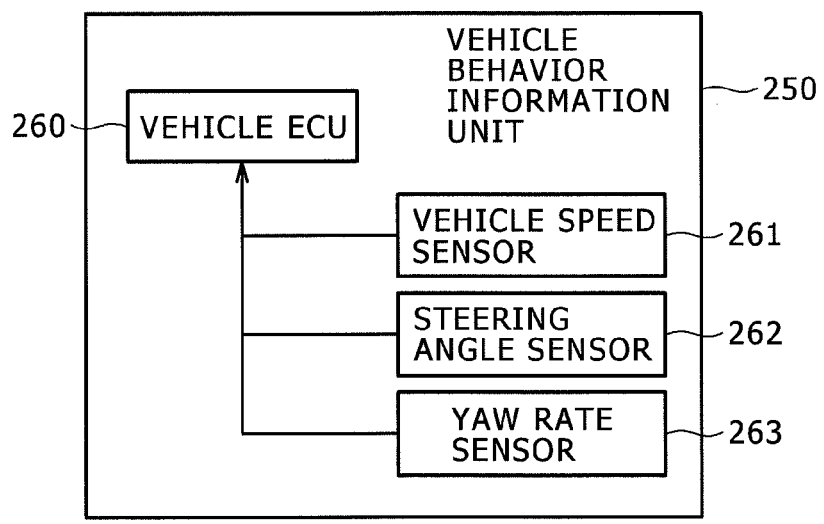
FIG. 3 is a diagram showing a configuration example of a vehicle behavior information unit of the present invention.

As shown in FIG. 3, the vehicle behavior information unit 250 includes a vehicle speed sensor 261 that measures a speed (a vehicle speed) of the vehicle, a steering angle sensor 262 that measures a steering angle of a steering wheel, a yaw rate sensor 263 that measures a rate of rotation based on steering of the vehicle, and a vehicle ECU (vehicle engine control unit) 260 which is a vehicle control unit that controls vehicle behavior based on vehicle behavior information inputted from these sensors. However, the vehicle behavior information acquired by the vehicle behavior information unit 250 may include at least one of the speed of the vehicle, the steering angle, and the yaw rate. The vehicle ECU 260 outputs inputted vehicle behavior information to the vehicle-mounted camera 100 and performs environment recognition by the vehicle-mounted camera 100. In an embodiment of light distribution control, accurate and stable tracking is performed by using the vehicle behavior information and a light of a vehicle in the nighttime is detected. A detection result of the vehicle-mounted camera 100 is outputted to the vehicle ECU 260 and the vehicle ECU 260 generates a signal to automatically control a high beam and a low beam of the lights of the vehicle on the basis of the detection result.

Figure 4:
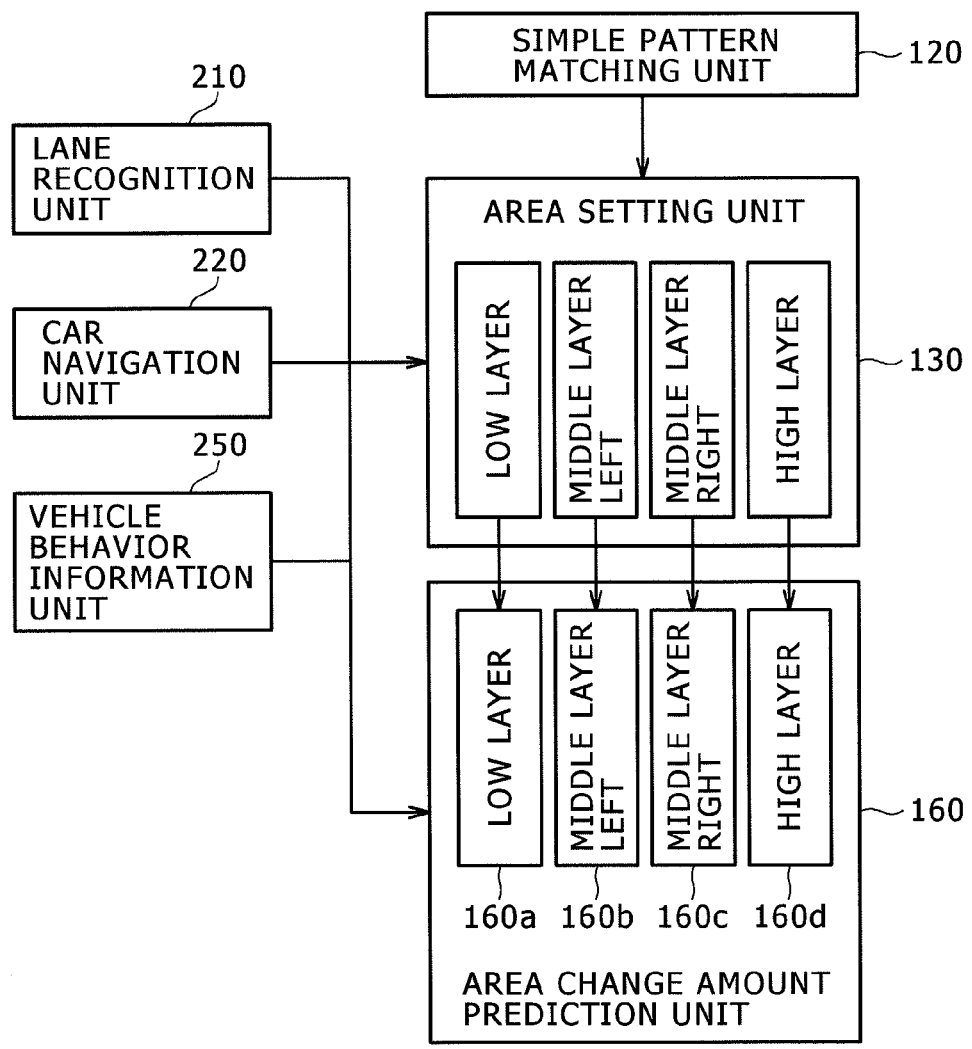
FIG. 4 is a diagram showing a configuration example of an area setting unit and a area change amount prediction unit of the present invention.

FIG. 4 shows details of the area setting unit 130 and the area change amount prediction unit 160.

In the present embodiment, as shown in FIG. 1, the input to the area setting unit 130 is only the point light source candidate that is the result of the simple pattern matching unit 120. However, as shown in FIG. 4, the area setting unit 130 may dynamically change a process area by using information from a lane recognition unit 210 in the image processing unit which performs lane recognition based on an image captured by the vehicle-mounted camera 100, a car navigation unit 220 which acquires map information, and the vehicle behavior information unit 250 described above. The area setting unit 130 can also calculate the vanishing point based on the result of the lane recognition process performed by the lane recognition unit 210 using the acquired image or calculate the vanishing point from the map information acquired by the car navigation unit 220.

FIG. 4 shows a part of the configuration of FIG. 1 in detail. The area setting unit 130 adds an area flag indicating an area of a plurality of the set areas (in the present embodiment, low layer 160a, middle layer left 160b, middle layer right 160c, and high layer 160d), to which the point light source candidate obtained from the simple pattern matching unit 120 belongs, to the point light source candidate and outputs the point light source candidate. The point light source candidate including the area flag is inputted into the area change amount prediction unit 160 and change amount prediction of a light point for each area is performed by a calculation method different according to the area flag. The dynamic setting change of the process area will be described later in detail with reference to FIGS. 8 and 9.

Figure 6A:
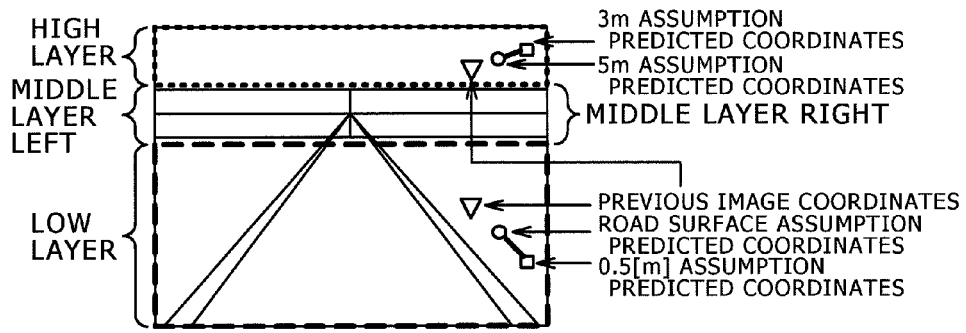
FIG. 6A is a diagram for explaining the area change amount prediction unit of a low layer and a high layer of the present invention.

In the area setting in FIG. 4, as shown in FIG. 6A, an image is divided into three areas in the vertical direction with respect to the vanishing point on the image. In this case, an area which includes the vanishing point and has a margin width in the vertical direction is defined as the middle layer and the image is vertically divided into the low layer 160a and the high layer 160d on both sides of the middle layer. Further, the middle layer is horizontally divided into the middle layer left 160b and the middle layer right 160c with respect to the vanishing point, so that the area is divided into four areas. In the present embodiment, four fixed areas are assumed be used. However, the dividing method of the area may be different, such as, depending on the setting angle of the camera, an area above the vanishing point is substantially out of the picture. The divided areas may dynamically change. The area is divided in this way, and the point light source candidate detected in the area is added an area flag of the area and outputted from the area setting unit 130.

The area change amount prediction unit 160 performs an area change amount prediction calculation according to the point light source candidate obtained from the area setting unit 130 and the result of the area flag of the point light source candidate.

Figure 6B:
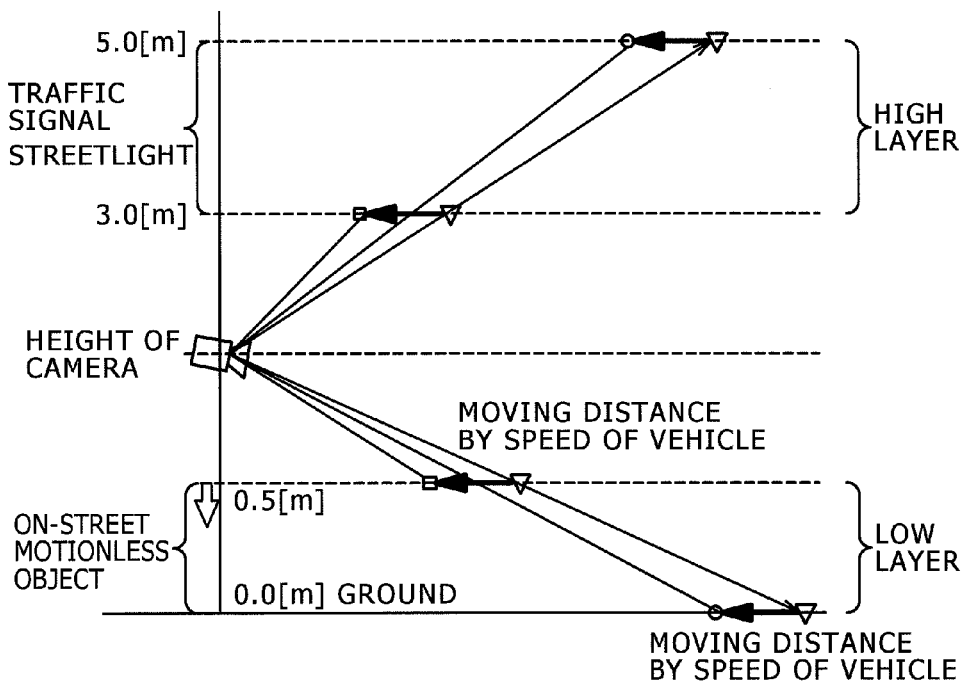
FIG. 6B is a diagram for explaining the area change amount prediction unit of the low layer and the high layer of the present invention.

As shown in FIGS. 6A and 6B, in the low layer 160a, the change amount prediction is performed by assuming that there is an object within the height of 50 cm from the road surface. In the middle layer left 160b and the middle layer right 160c, the change amount prediction calculation is performed by assuming that there is a vertical wall along the road. In the high layer 160d, the change amount prediction calculation is performed by assuming that there is a ceiling at the height of 3 m to 5 m. The area change amount prediction unit 160 includes constituent elements (an area three-dimensional position presumption unit 161a, an area three-dimensional position prediction unit 162a, and an area image position presumption unit 163a for the low layer 160a) for each area (a low layer 160a, a middle layer left 160b, a middle layer right 160c, and a high layer 160d).

Figure 5:
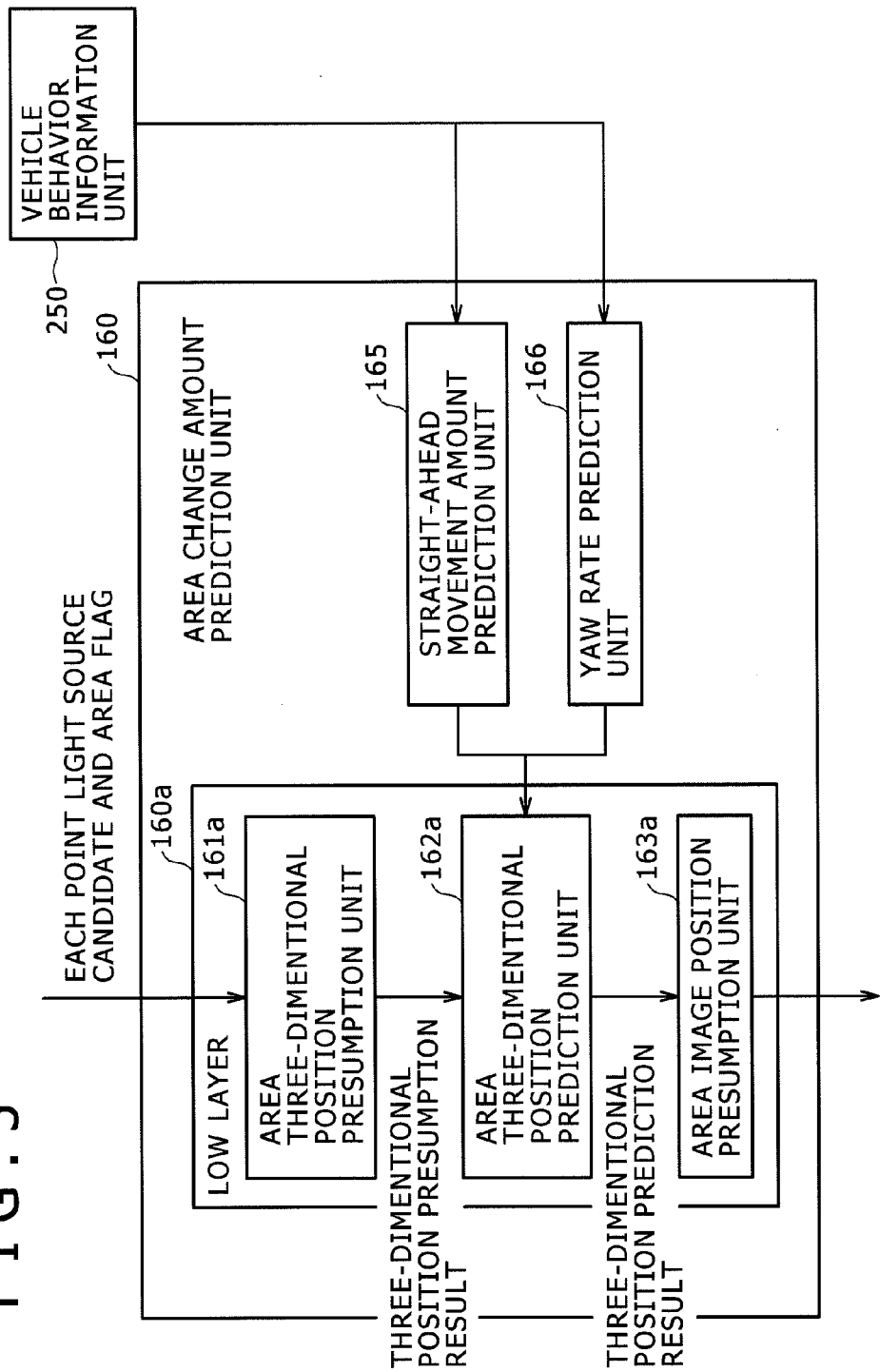
FIG. 5 is a diagram showing a configuration example of the area change amount prediction unit of the present invention.

FIG. 5 shows details of the configuration of the low layer 160a of the area change amount prediction unit 160. Although FIG. 5 omits the middle layer left 160b, the middle layer right 160c, and the high layer 16d, the detailed configurations are the same as that of the low layer 160a in FIG. 5.

In the low layer 160a of the area change amount prediction unit 160 in FIG. 5, in the area three-dimensional position presumption unit 161a, a three-dimensional position of the point light source candidate in a three-dimensional vehicle coordinate system using the center of gravity of the vehicle as the origin from the position of the point light source candidate in a two-dimensional image coordinate system. Specifically, the area change amount prediction unit 160 includes, in the low layer 160a, the area three-dimensional position presumption unit 161a which presumes a three-dimensional position of an object candidate in a three-dimensional vehicle coordinate system using the center of gravity of the vehicle as the origin from the image position of the object candidate in the two-dimensional image coordinate system inputted from the pattern matching unit 120, the area three-dimensional position prediction unit 162a which predicts a three-dimensional position of the object candidate in a vehicle coordinate system after, predetermined periods on the basis of the vehicle behavior information and the presumption result of the three-dimensional position of the object candidate in the vehicle coordinate system obtained by the area three-dimensional position presumption unit 161a, and the area image position prediction unit 163a which converts the prediction result of the three-dimensional position predicted by the area three-dimensional position prediction unit 162a into image coordinates and calculates the image position of the object.

Next, the vehicle behavior is predicted by using information of the vehicle speed, the steering angle, and the yaw rate from the vehicle behavior information unit 250 as an input.

Next, a straight-ahead movement amount prediction unit 165 predicts a movement component of a straight-ahead movement of the vehicle and a yaw rate prediction unit 166 predicts a yaw rate of the steering. The straight-ahead movement amount prediction unit 165 and the yaw rate prediction unit 166 are configured separately from each other, so that even in a vehicle that cannot obtain rotation information from devices such as the steering angle sensor 262 and the yaw rate sensor 263, the vehicle behavior is can be predicted by using only the result of the straight-ahead movement amount prediction unit 165.

The area three-dimensional position prediction unit 162a predicts the position of the object in the vehicle coordinated system after N periods by using the vehicle behavior prediction obtained by the straight-ahead movement amount prediction unit 165 and the yaw rate prediction unit 166 and the three-dimensional position presumption result of the point light source in the vehicle coordinate system obtained by the area three-dimensional position presumption unit 161a. The obtained three-dimensional position prediction result is returned to the image coordinates by the area image position prediction unit 163a and used as an index of the tracking.

The straight-ahead movement amount prediction unit 165 and the yaw rate prediction unit 166 have the same configuration regardless of the process areas. A three-dimensional position presumption unit, a three-dimensional position prediction unit, and an image position prediction unit for each area will be described later in detail.

In the change amount prediction calculation, there may be a method in which the three-dimensional position prediction result is not returned to the image coordinates but converted into three-dimensional coordinates and the tracking is performed. However, when the vehicle-mounted camera is a monocular camera, the farther, the lower the resolution of the distance is. Therefore, when determining whether or not the object is to be tracked, if it is determined by a fixed value, such as, the object is determined to be tracked when an error is smaller than or equal to 1 m, the object is not to be tracked even if the difference from the prediction is only 1 pix in a distant area. On the other hand, the object may be determined to be tracked even if the difference from the prediction is 50 pix in a nearby area. Therefore, it is difficult to determine simply by a fixed distance threshold value.

In practice, the distance resolution decreases in a distant area, so that the farther, the larger the distance presumption error is. Therefore, similarly, the predicted three-dimensional position includes an error which increases as the object goes away from the vehicle. When the three-dimensional position is used to determine whether or not the object is to be tracked, it is necessary to use a threshold value considering the magnitude of the error. Or, as shown in FIGS. 6A and 6B of the present embodiment, when the determination is performed on the image coordinates by using the result obtained by recalculating the three-dimensional prediction position into image coordinates by the image position prediction unit 163a, a threshold value taking into account the distance resolution, which decreases as the distance from the vehicle increases, can be naturally set. Therefore, it is possible to stably evaluate the degree of similarity both in a distant area and a nearby area.

Next, the straight-ahead movement amount prediction using the vehicle speed shown in FIG. 10 will be described.

As shown by the formula (1) in FIG. 10, the image coordinates of a certain point light source candidate at a time t are represented as (ut, vt, 1) and the position in the three-dimensional vehicle coordinate system are represented as (Xt, Yt, Zt, 1).

A relationship between a three-dimensional camera coordinate system whose origin is located at the center of the lens of the vehicle-mounted camera 100 and an image coordinate system is represented by a camera internal parameter matrix. The camera internal parameter matrix includes a focal length, a unit length of an image capturing element, an angle of the image capturing element, and the image center. The camera internal parameter matrix can describe a correspondence relationship between the three-dimensional camera coordinates and the image coordinates.

Next, a conversion between the camera coordinate system and the vehicle coordinate system is represented by a camera external parameter matrix. To calculate the camera external parameter matrix, first, the height of the camera from the road surface and further the depression angle of the camera are calculated from the vanishing point on the image and the camera external parameters are set. The relationship between the three-dimensional vehicle coordinates and the two-dimensional image coordinates is represented by the formula (1) by using the camera internal parameters and the camera external parameters.

Although the camera internal parameters are set based on design values, values obtained by performing calibration in advance may be used. The camera external parameters are calculated from a design value of the height of the camera and the result of the vanishing point on the image. The external parameters are updated by sequentially updating the vanishing point using the result of the lane recognition, so that the conversion to and from the three-dimensional coordinates may be performed more accurately.

From the above description, as shown by the formula (1) in FIG. 10, the conversion from the vehicle coordinate system to the image coordinate system can be performed. However, when using the formula (1) without change, the conversion from the two-dimensional image coordinate system to the three-dimensional vehicle coordinate system cannot be uniquely calculated. Therefore, by adding a three-dimensional constraint condition, the conversion is uniquely performed. Methods to add the three-dimensional constraint condition are different for each area set by the area setting unit 130 described above.

For example, if it is assumed that there is a constraint condition that objects on the image are located on the road surface in the formula (1), the image coordinates (ut, vt, 1) and a height component Yt of the vehicle coordinates are known condition, so that unknown variables in the formula (1) are only Xt and Zt and it is possible to calculated a horizontal position Xt and a depth Zt. An amount of movement vm expected in the next period by a vehicle speed CarSpeed of the vehicle is added to the three-dimensional position (Xt, Yt, Zt, 1) in the vehicle coordinate system of the calculated point light source candidate, so that a predicted position (Xt, Yt, Zt-Vm, 1) in the vehicle coordinate system is set. The predicted position (Xt, Yt, Zt-Vm, 1) is multiplied by the camera external and the camera internal parameter matrixes, so that the image coordinates (ut+1, vt+1, 1) in the current period are predicted (see formula (2)).

Figure 11:
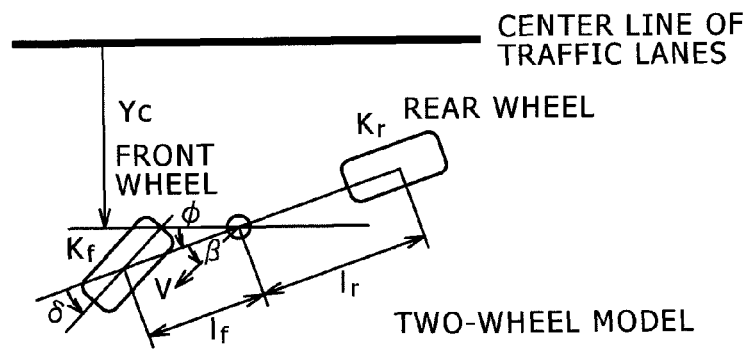
FIG. 11 is a diagram for explaining a yaw rate prediction based on a steering angle of the present invention.

Next, for a yaw rate prediction, a formula (3) to calculate a yaw rate when input is a steering angle in a two-wheeled model shown in FIG. 11 is described below. In the present embodiment, the yaw rate is calculated by using a steering angle α and a vehicle speed V as input.

[Expression 1]

$$\gamma = \frac{1}{1 - \frac{m}{2l^2} \cdot \frac{l_f K_f - l_r K_r}{K_f K_r} \cdot V^2} \cdot \frac{V}{l} \delta \quad \text{(Formula 3)}$$

Here, if is a distance from the center of gravity to the front wheel, lr is a distance from the center of gravity to the rear wheel, m is a vehicle mass, V is a vehicle speed, Kf is tire cornering power of the front wheel, Kr is tire cornering power of the rear wheel, δ is a steering angle of the front wheel, β is a slip angle of the vehicle body, and γ is a yaw rate.

The steering angle α is inputted and all the variables other than δ on the right side are known, so that the yaw rate can be calculated. An amount of movement of the point light source candidate on the image when the vehicle curves are calculated based on the calculated yaw rate. The amount of movement can be calculated when the specifications of the camera such as the angle of view and the number of pixels are known.

In a vehicle in which the yaw rate sensor 263 is mounted, the yaw rate may be directly used. However, it is preferable to use more accurate and stable data. When the yaw rate of the vehicle is calculated, a turning angle velocity at which the camera moves in the horizontal direction when steering the vehicle is known, so that an amount of movement of the image corresponding to a yaw angle changed from here to one period later can be predicted.

The present embodiment is assumed to be used for tracking before recognizing an object, so that the present embodiment is desired to be used for movement prediction in a state in which it is unknown whether an object is present or absent on the road surface. Therefore, in the present embodiment, the predicted position on the image is calculated by adding an allowance to the three-dimensional constraint condition, so that a position on the image with an allowance is predicted and the tracking is performed in a range of the position. Therefore, stable tracking is realized.

Tracking for Each Area

Next, tracking methods for each area in the tracking unit 170 will be described. The tracking methods will be described corresponding to the area setting described above.

In the light distribution control, a stable detection of another vehicle is an important factor to control the headlights of the vehicle. Therefore, it is controlled so that time series variation of the recognition result of the point light source is small as much as possible by stably tracking the point light source candidate including a noise factor. In the nighttime vehicle detection, it is necessary to recognize a vehicle from a point light source having very few shape characteristics, so that it is difficult to determine whether or not the point light source indicates a vehicle by only simple pattern matching.

In particular, when detecting a two-wheeled vehicle in addition to a four-wheeled vehicle, it is not enough to detect only a light source having two point light sources in the horizontal direction. When considering tracking of a point light source candidate including a noise factor, the tracking is desired to be performed before determining whether or not the point light source candidate is a vehicle. If a point light source candidate can be tracked, a point light source candidate of a part of point light sources can be determined to be a moving object or a motionless object from movement on the image. If the tracking can be performed, it is possible to perform stable recognition determination by using time series results. Therefore, it is important that the tracking can be performed before recognition determination of point light source.

First, the case of the low layer 160a in FIG. 6A will be described.

An area below the middle layer having a margin width from the vanishing point of the image captured by the vehicle-mounted camera 100 is set as an area of the low layer 160a. In this area, light sources of low height such as a triangle plate and a reflective plate come in addition to lights of an oncoming vehicle and a leading vehicle.

A change amount prediction calculation of the area change amount prediction unit 160 in the case of the low layer 160a will be described in detail.

As shown in FIG. 6B, the change amount prediction calculation is performed by assuming that the height of the vehicle-mounted camera 100 is 120 cm from the road surface and a point light source is present between the heights of 50 cm and 0 cm. First, a three-dimensional position in the vehicle coordinate system in which a point light source candidate is expected to be present is presumed from the image coordinates of the point light source candidate which belongs to the low layer 160a. When using the formula in FIG. 10 without change, it is not possible to uniquely determine the three-dimensional vehicle coordinate system from the two-dimensional image coordinates, so that a three-dimensional constraint condition is added. In the low layer 160a, as shown in FIG. 6B, an assumption that a point light source belonging to the area of the low layer 160a on the image is present between 50 cm and 0 cm is used. In the case of a motionless object, in the three-dimensional vehicle coordinate system, the object approaches the vehicle-mounted camera 100 mounted in the vehicle by a moving distance by the speed of the vehicle. The moving distance is indicated by thick arrows shown at the heights of 50 cm and 0 cm in FIG. 6B. Even if the moving distance is the same in the three-dimensional coordinate system, when the point light source candidate is located at the height of 50 cm which is near from the vehicle-mounted camera 100, the amount of movement on the screen is large. When the point light source candidate is located at the height of 0 cm which is far from the vehicle-mounted camera 100, the amount of movement on the screen is small. Therefore, the area three-dimensional position presumption unit 161a presumes a three-dimensional position when assuming that the point light source candidate is located at the height of 50 cm and a three-dimensional position in the vehicle coordinate system when assuming that the point light source candidate is located at the height of 0 cm.

In the low layer area in FIGS. 6A and 6B, inverted triangles indicate the previous image coordinates. The three-dimensional positions presumed by the area three-dimensional position presumption unit 161a on the basis of the previous point light source candidate image coordinates are shown. To predict a moving destination after one frame by the behavior of the vehicle, a straight-ahead movement component of a predicted amount of movement is obtained from the straight-ahead movement amount prediction unit 165 and a rotation component of the predicted amount of movement is obtained from the yaw rate prediction unit 166. In FIG. 6A, a three-dimensional predicted position in the case of the height of 50 cm is indicated by a square and a three-dimensional predicted position in the case of the height of 0 cm is indicated by a circle. When assuming a plane near from the camera, it is predicted that the movement on the image is large, and when assuming a plane far from the vehicle-mounted camera 100, it is predicted that the movement on the image is large. Therefore, an object to be tracked which is expected to be present between the heights of 0 cm and 50 cm from the road surface can be considered to be present between a predicted coordinates on the image indicated by a circle on a road surface assumption and a predicted coordinates on the image indicated by a square on a 0.5 m assumption shown in FIGS. 6A and 6B.

However, in the low layer 160a, it is desired to track and chase not only a motionless object, but also a moving object, so that, in practice, it is necessary to add an amount of movement of another vehicle in addition to the moving distance by the speed of the vehicle. It is possible to analyze whether a light source is a red tail light or a headlight by analyzing the color of the object by the simple pattern matching unit 120. In other words, the simple pattern matching unit 120 can analyze the color of the object from the image acquired by the vehicle-mounted camera 100 and determine whether the object is a leading vehicle or an oncoming vehicle from the analysis result. Therefore, the simple pattern matching unit 120 assumes that the object is a leading vehicle when the light source is red and assumes that the object is an oncoming vehicle when the light source is white, so that the simple pattern matching unit 120 defines a range of behavior of the other vehicle. Thereby, if the light source is red and the vehicle is driving at a vehicle speed of 40 km/h, it is assumed that the leading vehicle is driving at a speed of 0 to 60 km, and a prediction calculation of a tracking search range is performed. If the speed of the leading vehicle is obtained from a radar or each image processing result, it is possible to set a range of a leading vehicle presumption speed. For example, if the leading vehicle speed is presumed to be 35 km, the prediction calculation may be performed by assuming that the leading vehicle speed is between 25 km and 45 km.

A range in which the object can move from a point of the past on the image is calculated by the prediction calculation, so that an area in which an object to be tracked is searched is limited. Thereby, not only the calculation load is reduced, but also a tracking error is successfully prevented from occurring.

In the high layer 160d, it is desired to track light sources of high height such as a traffic signal, a streetlight, and a signboard. The calculation method is substantially the same as that in the low layer 160a. Planes in parallel with the road surface are assumed at the heights higher than the vehicle-mounted camera 100, that is, at the height from 3 m to 5 m, and the prediction calculation is performed at positions crossing the planes.

Next, the middle layer left 160b and the middle layer right 160c will be described.

In the middle layer left 160b and the middle layer right 160c, the process is symmetric, so that only the right process shown in FIG. 7A will be described. Images of a light source located at the same height as the vehicle-mounted camera 100 and a light source located at a distant place are captured in an area of the middle layer left 160b or the middle layer right 160c. In particular, in a portion near the edge of the image, an image of a light source near the vehicle tends to be captured. The moving distance of the light source on the image is large, so that the light source is difficult to be tracked.

Even if planes in parallel with the road surface are assumed in the same manner as in the low layer 160a or the high layer 160d, in the middle layer, the degree of accuracy of the three-dimensional position presumption calculation of an object near the same height as the camera degrades. Therefore, in the middle layer left 160b or the middle layer right 160c, which is the second area, as shown in FIG. 7B, it is assumed that there are vertical walls on left and right along the road and points intersecting the planes are calculated, so that a three-dimensional position prediction presumption calculation is performed (a change amount prediction calculation method in the middle layer). The area three-dimensional position prediction unit 162a of the middle layer right 160c assumes that there are vertical walls at a short distance of 1 m and at a long distance of 4 m on the right side of the vehicle and performs the prediction calculation.

Figure 7A:
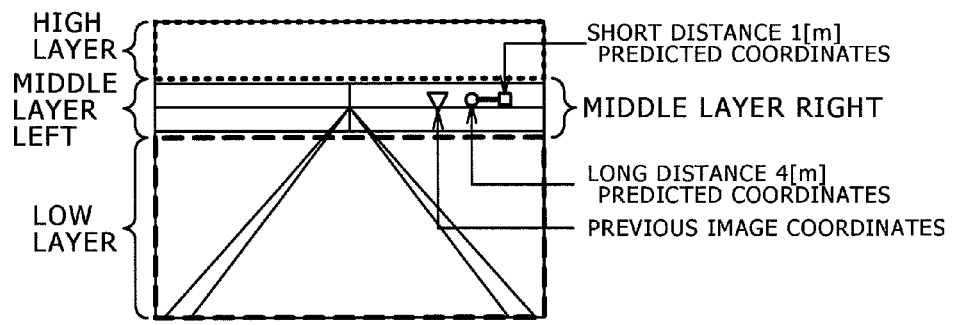
FIG. 7A is a diagram for explaining the area change amount prediction unit of a middle layer of the present invention.
Figure 7B:
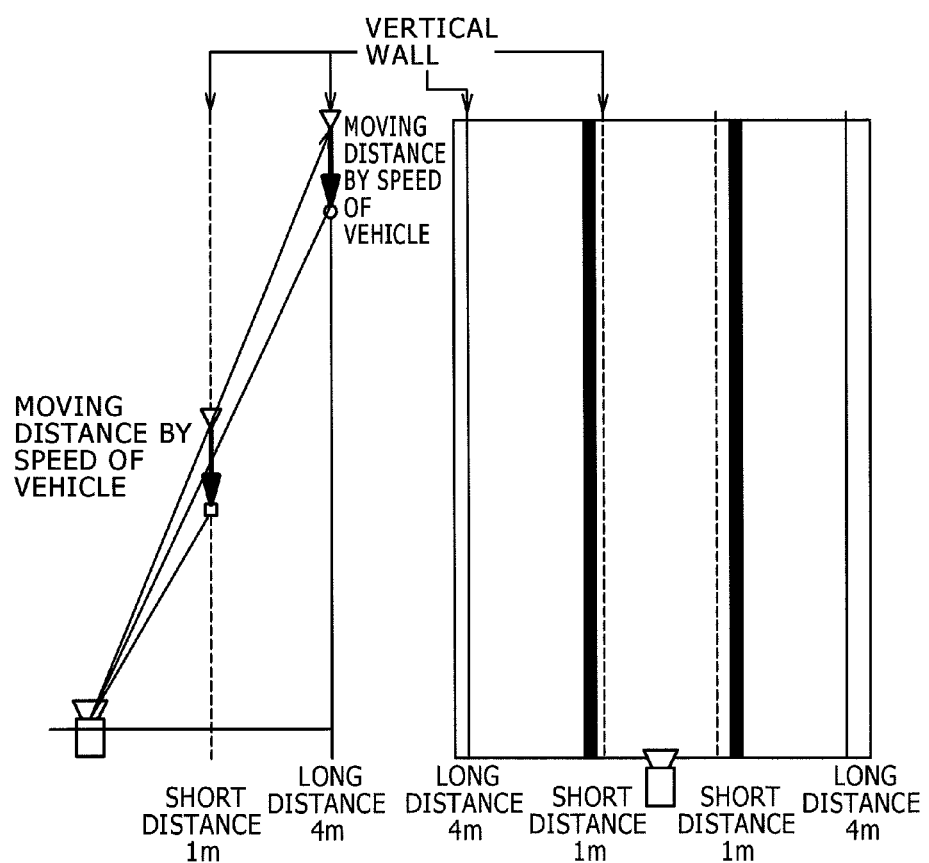
FIG. 7B is a diagram for explaining the area change amount prediction unit of the middle layer of the present invention.

As shown by the prediction result in FIG. 7A, when a point light source is located at the short distance of 1 m, the amount of movement on the image is large. Short distance 1 m predicted coordinates are indicated by a square. The more distant, the smaller the movement is. Long distance 4 m predicted coordinates are indicated by a circle. The previous image coordinates of the point light sources which are base of the prediction are indicated by an inverted triangle. In this way, the movement prediction on the image and the image coordinates of the long distance and the short distance are calculated and these values are used as a search range to narrow down an area of tracking search.

In short, when the area change amount prediction unit 160 predicts a change amount of the object, the area change amount prediction unit 160 limits the heights of the object and the vehicle-mounted camera 100 which is the vehicle-mounted image capturing apparatus or a range in which the object moves and predicts the change amount.

Further, on the basis of the result whether the object to be tracked is a leading vehicle or an oncoming vehicle, which is determined by the simple pattern matching unit 120, the prediction calculation of the amount of movement on the image is performed in a speed range of a behavior of the vehicle and a behavior of another vehicle. In this way, even when the object to be tracked is unknown, the image position of the next frame on the image is presumed for each area described above as an index to efficiently perform tracking.

Dynamic Area Change

Figure 8:
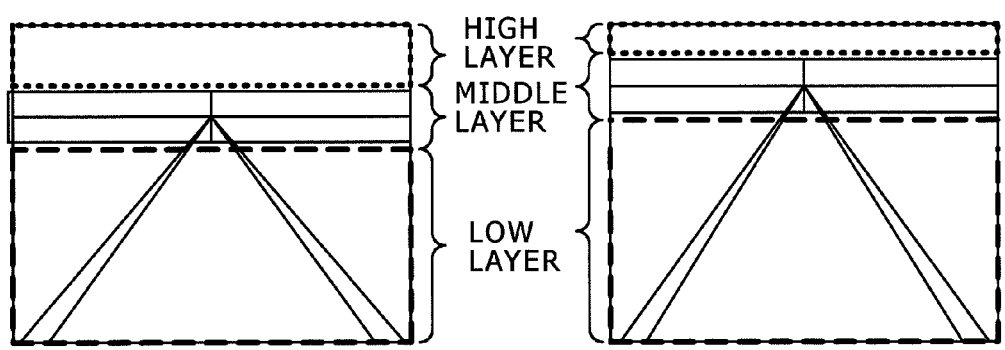
FIG. 8 is a diagram for explaining a dynamic area change based on a lane recognition result of the present invention.

Next, as shown in FIGS. 4 and 8, the areas divided by the area setting unit 130 may use the lane recognition result of the lane recognition unit 210 as one of the methods for dynamically obtaining the movement of the vanishing point. FIG. 8 shows a dynamic change of the area when the vanishing point obtained by the lane recognition moves in the vertical direction on the screen.

When the vanishing point moves in the vertical direction on the screen, it can be seen that the division of the areas also moves on the screen accordingly. In this way, the areas may be changed in the height direction on the image of the low layer 160*a*, the middle layer left 160*b*, the middle layer right 160*c*, and the high layer 160*d* on the basis of the change of the position of the vanishing point.

Figure 9A:
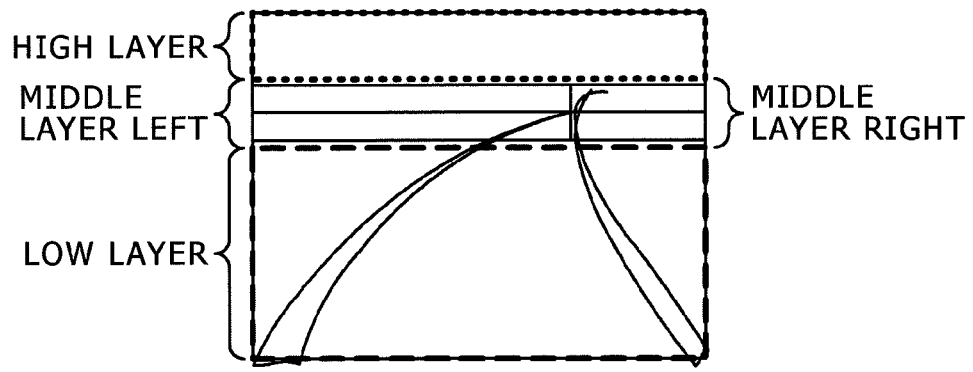
FIG. 9A is a diagram for explaining a dynamic area change based on a road structure of the present invention.
Figure 9B:
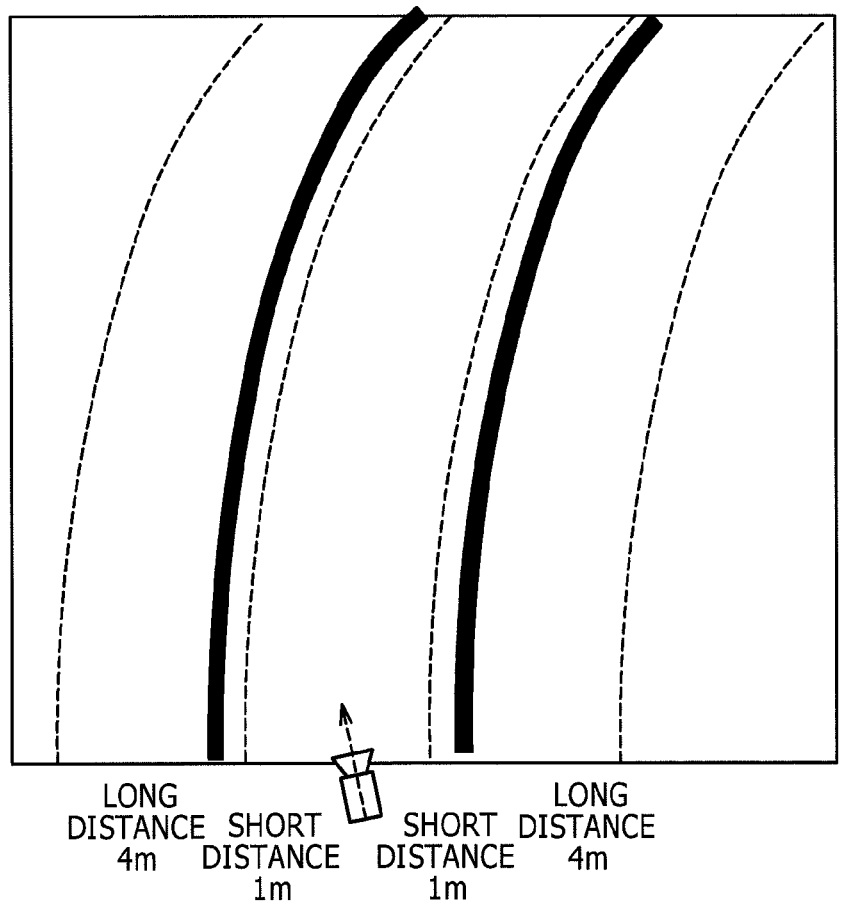
FIG. 9B is a diagram for explaining a dynamic area change based on the road structure of the present invention.

When the curvature of the road as shown in FIG. 9A can be detected by the lane recognition of the lane recognition unit 210 by the vehicle-mounted camera 100, the prediction calculation of the middle layer left 160*b* or the middle layer right 160*c* may be performed by defining walls, which are along the curvature of the road and perpendicular to the road as shown in FIG. 9B. The areas that intersect the walls defined left and right change according to the curvature of the road, so that, as shown in FIGS. 9A and 9B, the middle layer left 160*b* and the middle layer right 160*c* may be dynamically changed from the state shown in FIG. 8.

Determination of Motionless Object

In the present embodiment, relative position and posture of a motionless object which is located on the road surface or whose height is known are changed by only the behavior of the vehicle, so that how much a point light source candidate matches a predicted change amount for each area is determined by using the calculation method described above, and if the point light source matches the predicted change amount, the point light source candidate is determined to be a motionless object located on a plane whose height relative the camera is known.

In the present embodiment, when performing recognition of a simple shape where noise cannot be sufficiently removed only by pattern matching or an object such as a point light source, which is difficult conventionally, whether or not the object is a motionless object to be recognized is determined by not only recognizing a pattern on an image, but also observing and tracking the pattern in time series and observing the degree of similarity between change of the position and the area of the pattern and a result in which the pattern is predicted to be a motionless object.

A position on the image at the next period FrmT is predicted from the point light source of the previous period.

Figure 12:
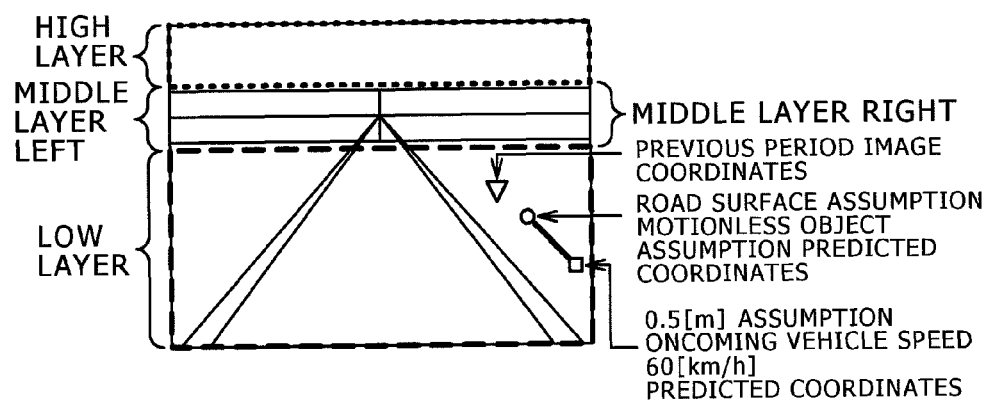
FIG. 12 is a diagram for explaining an on-street motionless object determination of the present invention.

The left side of FIG. 12 shows the image coordinates of the point light source at the previous period FrmT−1 and the right side shows predicted coordinates at the current period FrmT predicted from the point light source candidate. The predicted coordinates of a road surface assumption is indicated by a circle and the predicted coordinates of a 0.5 m assumption is indicated by a square. When the point light source candidate is a motionless object located on the road surface, the tracking occurs every time near the predicted coordinates (circle) of the assumed road surface. By using these characteristics, the object determination unit 190 determines whether or not the point light source candidate is a motionless object by performing observation in the time direction.

When detecting a nighttime tail light, if the point light source candidate is determined to be an on-street motionless object, it is highly likely a reflective plate or a triangle plate placed on the road, so that it is not determined to be a tail light of a vehicle.

In this way, even if there is no pair of left and right lights of a four-wheeled vehicle, it is possible to eliminate an on-street motionless object that will be a cause of noise. Therefore, in conventional methods, when detecting a two-wheeled vehicle, the number of misdetections inevitably increases. However, when the present embodiment is applied, noise can be significantly reduced and a two-wheeled vehicle can be detected.

A detection candidate located at a distant place moves not so much on the image and may be difficult to detect. However, it is possible to determine a small movement as a large movement by using a long time prediction, so that it is possible to determine whether or not the detection candidate is a motionless object. Here, although the prediction of the current period is performed from data of one period before, the prediction may be performed from a plurality of data, such as data of n periods before, or data of one, two, and four periods before, and it is possible to check whether or not the data corresponds to the motion of an on-street motionless object. As described above, the present embodiment can be used not only to perform accurate and efficient tracking, but also to determine whether or not an object is a motionless object.

Although a change of the area in a distant place may not be recognized, in a prediction result of tracking in a nearby place, it is confirmed that an area prediction result increases on the image. To predict a change of the area, the enlargement ratio may be calculated by using two points or more enclosing the candidate area, such as vertical corners or horizontal corners on the image, or four corners in the vertical direction and the horizontal direction, or diagonal lines. Although both of the area and the predicted position are used here, the determination may be performed using only the predicted position.

Optimization of Tracking of Moving Object

Even when the point light source candidate is a moving object, the moving object is desired to be tracked. First, it is determined whether the moving object is an oncoming vehicle or a leading vehicle according to a determination result of whether the point light source candidate is white or red. According to the determination result, if the moving object is an oncoming vehicle, the oncoming vehicle speed is assumed to be 60 km to 0 km in the oncoming direction when the road is a general road. If the moving object is a leading vehicle, the leading vehicle speed is assumed to be 60 km to 0 km in the same direction as the vehicle.

FIG. 12 shows an example of tracking when the point light source candidate is a white light source. The search range of the tracking is between a case in which movement on the image is smallest and a case in which movement on the image is largest. The case in which movement of the point light source candidate is smallest is a case of a motionless object and the vehicle speed is 0 km. On the other hand, the case in which movement is largest is a case in which the oncoming vehicle speed is 60 km. Here, further, considering the height assumption from the road surface, the case in which movement is smallest is the road surface assumption motionless object predicted coordinates and the case in which movement is largest is the predicted coordinates of the height 50 cm assumption and the oncoming vehicle speed is 60 km.

These are the predicted coordinates of the two points shown in FIG. 12. Light sources whose brightness and shapes are similar are searched between the predicted two points. At this time, if a recognition object is found for each frame around the predicted position which is assumed to be an on-street motionless object, it is determined that the recognition object is an on-street motionless object, and the recognition object is determined to be a noise factor which is not used for the light distribution control.

Another Hardware Configuration

Figure 13:
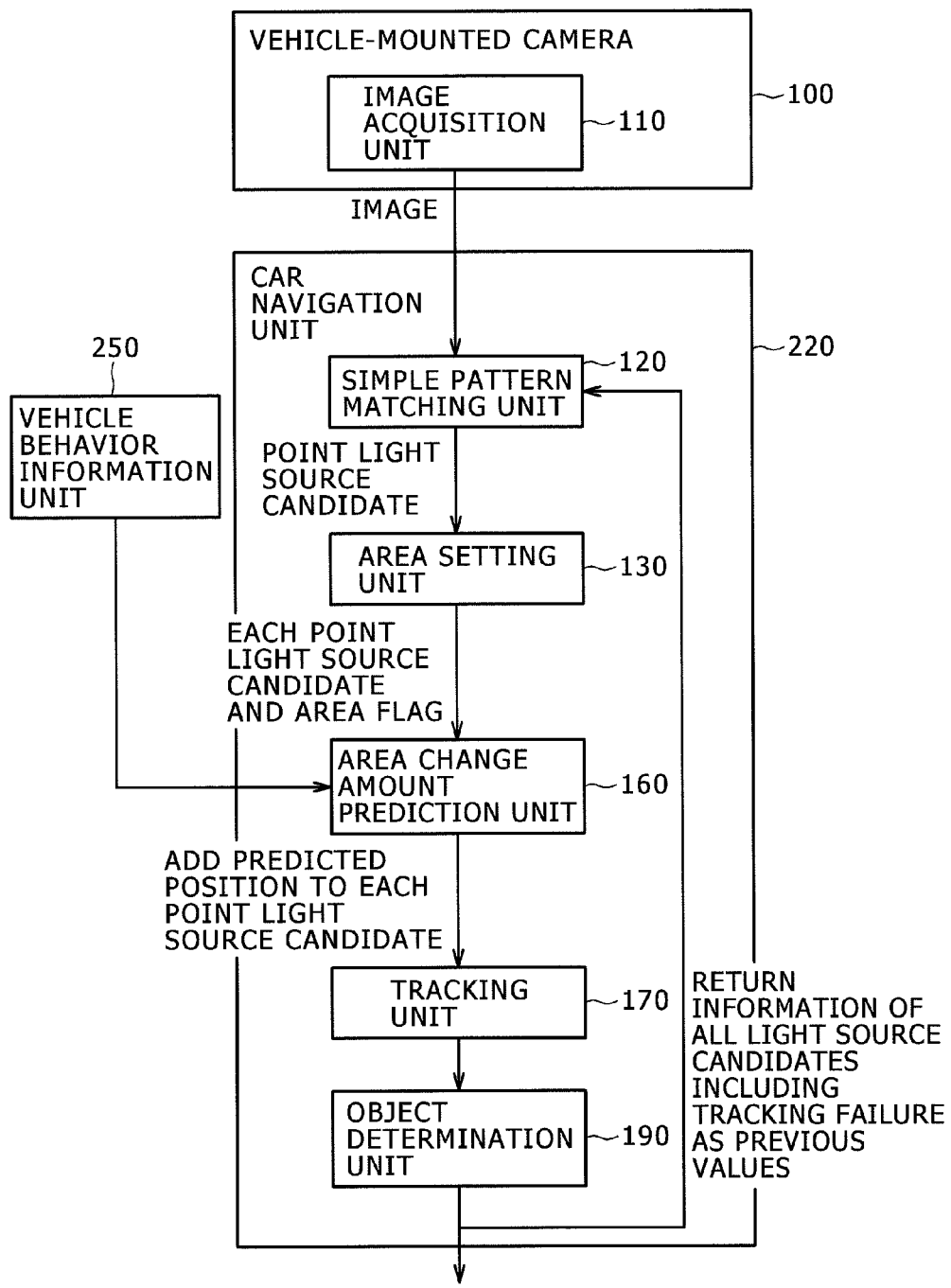
FIG. 13 is a diagram showing another configuration example of the vehicle-mounted environment recognition apparatus according to the present invention.

FIG. 13 shows another configuration example of the vehicle-mounted environment recognition apparatus of the present invention.

Compared with FIG. 1, the vehicle-mounted environment recognition apparatus has a hardware configuration in which the image processing portion is transferred to an external car navigation unit 220 from the vehicle-mounted camera 100 including the image acquisition unit 110. Basically, the hardware configuration is a configuration in which the image processing portion other than the image acquisition unit 110 in the configuration shown in FIG. 1 is transferred to the car navigation unit 220. Specifically, a vehicle-mounted environment recognition apparatus including the simple pattern matching unit 120, the area setting unit 130, the area change amount prediction unit 160, the tracking unit, and the object determination unit 190 described above is provided to a CPU of the car navigation unit 220 from the vehicle-mounted camera 100 which is the vehicle-mounted image capturing device. Each image processing unit transferred to the car navigation unit 220 are the same as those shown in FIG. 1. The configuration will be briefly described below.

Images for image processing are inputted into the car navigation unit 220 from the image acquisition unit 110 of the vehicle-mounted camera 100 at all times. The simple pattern matching unit 120 performs simple pattern matching based on an imputed image and a point light source candidate is extracted. Next, an area flag of an area to which the point light source candidate belongs is added to the point light source candidate by the area setting unit 130. The area change amount prediction unit 160 performs a change amount prediction for each area by using the point light source candidate and the area flag as input, so that the tracking search range is determined. The vehicle behavior information unit 250 inputs information into the area change amount prediction unit 160 in the car navigation unit 220. As a result, the tracking unit 170 performs tracking based on each point light source candidate and the predicted position. The object determination unit 190 performs an object determination based on the result of the tracking and the predicted position.

Embodiment of Light Distribution Control

An embodiment that performs light distribution control using the output of the vehicle-mounted environment recognition apparatus described above will be described.

The nighttime moving object detection has been described. The point light source of moving object and the point light source of motionless object are sorted out from the above description and the lights of the vehicle are automatically controlled according to the point light source of the moving object.

Specifically, the light distribution of the vehicle is controlled according to an object determination result outputted from the object determination unit 190. Thereby, it is possible to realize tracking accurately and stably, so that the automatic control of the lights can also be stably performed.

Embodiment of LDW

An embodiment that performs LDW (Lane Departure Warning) control using the output of the vehicle-mounted environment recognition apparatus described above will be described.

The difference from the nighttime vehicle detection for the light distribution control described above will be described. The LDW is applied to accurately detect lane marks made of traffic buttons called bots dots which are often seen on roads near Los Angeles, USA, North America.

As shown in FIG. 1, the system configuration is the same. The simple pattern matching unit 120 performs pattern matching to detect a traffic button having a radius of about 5 cm and having high brightness at the center by using an image acquired by the image acquisition unit 110. Next, the result of the pattern matching is tracked based on the result predicted by the change amount prediction unit. If the result of the pattern matching is one of bots dots present on the road surface, the change amount prediction unit predicts the change amount of the position and the size on the image according to the behavior of the vehicle and determines whether or not the result of the pattern matching is an on-street motionless object by sequentially analyzing whether or not the position and the size correspond to the prediction.

Only when the tracking is successfully performed based on the behavior of the vehicle, an object can be recognized as the amount of characteristics of an on-street motionless object or a lane mark, so that it is possible to remove causes of misdetection such as flicker of reflection of sunlight from the road surface, reflection from moving objects around the vehicle, for example, reflection from a wheel portion of another vehicle, and an object such as a metal portion of a truck which tends to be misdetected as a lane mark on the image. In the above misdetection example, the flicker cannot be tracked, and other moving objects do not move in a predicted direction, so that the other moving objects cannot be tracked and removed as noise. In the case of the lane recognition, the object determination unit 190 performs a process to extract a lane mark aligned linearly on the screen, so that even if some noise remains, it does not cause a big problem.

Detection of Streetlight

For the light distribution control, the presence or absence of streetlight is detected and whether or not the vehicle is driving in an urban area is determined.

If the vehicle is driving in an urban area, the lights of the vehicle are controlled, such as, the high beam is cancelled. Although the streetlight highly likely comes in the high layer area, the height of the streetlight is unknown. Therefore, in the high layer, a range of the height, such as 3 m to 5 m, is defined and the tracking is performed on the basis of the definition. Although a streetlight located at a distant place may enter the middle layer, only streetlights located at a distant place enter the middle layer and the amount of movement on the image is not so large, so that the streetlight can be an index for performing tracking even in the three-dimensional presumption calculation in the middle layer left and the middle layer right.

Similarly, in the tracking when detecting a traffic signal, it is possible to perform accurate and stable tracking by the prediction calculation using the behavior of the vehicle, and further, it is possible to perform image processing more efficiently.

Detection of Road Sign

When detecting a road sign, the Hough transform of a circle is performed as simple pattern matching, a range of the height of the road sign is added to the detected road sign candidate, the road sign candidate is assumed, and the tracking is performed. The heights of the road signs are almost uncertain, so that, in the same manner as in the light distribution control and the streetlight detection, the search range can be limited by assuming the range of the height. Therefore, mistracking is prevented and the tracking is performed accurately and stably. Further, the search range is limited, so that it is possible to reduce the calculation load of the image processing.

Although the embodiment has been described above, the present invention is not limited to the embodiment and it is obvious for those skilled in the art that the invention can be variously changed and modified within the spirit of the invention and within the scope of the attached claims.

LIST OF REFERENCE SIGNS

100 Vehicle-mounted camera
110 Image acquisition unit
120 Simple pattern matching unit
130 Area setting unit
160 Area change amount prediction unit
165 straight-ahead movement amount prediction unit
166 Yaw rate prediction unit
170 Tracking unit
190 Object determination unit
210 Lane recognition unit
220 Car navigation unit
250 Vehicle behavior information unit
260 Vehicle ECU

The invention claimed is:

1. A vehicle-mounted environment recognition apparatus comprising:
a pattern matching unit which extracts an object candidate from an image acquired from a vehicle-mounted image capturing apparatus by using a pattern shape stored in advance and outputs a position of the object candidate;
an area change amount prediction unit which calculates a change amount prediction of the extracted object candidate on the basis of an object change amount prediction calculation method set differently for each area of a plurality of areas obtained by dividing the acquired image, detected vehicle behavior information, and an inputted position of the object candidate, and outputs a predicted position of an object;
a tracking unit which tracks the object on the basis of an inputted predicted position of the object; and
an area setting unit which divides the acquired image into a first area including a vanishing point and an area different from the first area to set a plurality of areas.

2. The vehicle-mounted environment recognition apparatus according to claim 1, wherein
the plurality of areas set by the area setting unit are a middle layer left area and a middle layer right area obtained by dividing the first area into two areas at the vanishing point, a low layer area which is set on one side of the first area in the vertical direction in the second area, and a high layer area which is set on the other side of the first area in the vertical direction in the second area.

3. The vehicle-mounted environment recognition apparatus according to claim 1, wherein
the vanishing point is calculated based on a result of a lane recognition process performed using the acquired image.

4. The vehicle-mounted environment recognition apparatus according to claim 3, wherein
a setting of the first area set by the area setting unit is dynamically changed based on the vanishing point calculated based on the result of the lane recognition process.

5. The vehicle-mounted environment recognition apparatus according to claim 1, wherein
a setting of the first area set by the area setting unit is dynamically changed based on acquired map information.

6. The vehicle-mounted environment recognition apparatus according to claim 1, wherein
a predetermined object change amount prediction calculation method in the first area is a method which assumes a wall perpendicular to a road on which the vehicle runs and performs a prediction calculation.

7. A vehicle-mounted environment recognition apparatus comprising:
a pattern matching unit which extracts an object candidate from an image acquired from a vehicle-mounted image capturing apparatus by using a pattern shape stored in advance and outputs a position of the object candidate;
an area change amount prediction unit which calculates a change amount prediction of the extracted object candidate on the basis of an object change amount prediction calculation method set differently for each area of a plurality of areas obtained by dividing the acquired image, detected vehicle behavior information, and an inputted position of the object candidate, and outputs a predicted position of an object; and
a tracking unit which tracks the object on the basis of an inputted predicted position of the object; wherein
the area change amount prediction unit includes
an area three-dimensional position presumption unit which presumes a three-dimensional position of the object candidate in a three-dimensional vehicle coordinate system using a position of the vehicle as an origin from the position of the object candidate in a two-dimensional image coordinate system inputted from the pattern matching unit,
an area three-dimensional position prediction unit which predicts a three-dimensional position of the object candidate in the vehicle coordinate system after predetermined periods on the basis of the vehicle behavior information and a presumption result of the three-dimensional position of the object candidate in the vehicle coordinate system obtained by the area three-dimensional position presumption unit, and
an area image position prediction unit which converts a prediction result of the three-dimensional position predicted by the area three-dimensional position prediction unit into image coordinates and calculates an image position of the object.

8. A vehicle-mounted environment recognition apparatus comprising:
a pattern matching unit which extracts an object candidate from an image acquired from a vehicle-mounted image capturing apparatus by using a pattern shape stored in advance and outputs a position of the object candidate;
an area change amount prediction unit which calculates a change amount prediction of the extracted object candidate on the basis of an object change amount prediction calculation method set differently for each area of a plurality of areas obtained by dividing the acquired image, detected vehicle behavior information, and an inputted position of the object candidate, and outputs a predicted position of an object;
a tracking unit which tracks the object on the basis of an inputted predicted position of the object; and
an object determination unit which determines whether or not the object is an on-street motionless object on the basis of a result where the tracking unit tracks the object; wherein
if the object is determined not to be an on-street motionless object, the object determination unit determines whether or not the object is a tail light of a vehicle on the basis of the result of the tracking.

* * * * *